US009369478B2

(12) United States Patent
Kumar et al.

(10) Patent No.: US 9,369,478 B2
(45) Date of Patent: Jun. 14, 2016

(54) OWL-BASED INTELLIGENT SECURITY AUDIT

(71) Applicant: VMware, Inc., Palo Alto, CA (US)

(72) Inventors: Vasantha Kumar, Tamil Nadu (IN); Azeem Feroz, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 148 days.

(21) Appl. No.: 14/174,710

(22) Filed: Feb. 6, 2014

(65) Prior Publication Data
US 2015/0222666 A1 Aug. 6, 2015

(51) Int. Cl.
H04L 29/06 (2006.01)
G06F 21/53 (2013.01)
G06F 21/55 (2013.01)

(52) U.S. Cl.
CPC ............ H04L 63/1425 (2013.01); G06F 21/53 (2013.01); G06F 21/552 (2013.01)

(58) Field of Classification Search
CPC ... H04L 63/101; H04L 63/1408; H04L 67/12; H04L 63/1441; H04L 69/329; H04L 63/1433; H04L 63/1425; H04L 63/20; G05B 15/02; G05B 21/02; G06N 99/005; G06F 21/577; G06F 17/30734; G06F 7/00; G06F 21/57; G06F 17/30286; G06F 17/30569; G06Q 10/06
USPC ......... 707/794, 804, 602, 608, 821, 953, 964, 707/791; 709/205, 219, 224; 713/166, 171; 726/1, 11–14, 22–26
See application file for complete search history.

(56) References Cited

U.S. PATENT DOCUMENTS

| 6,480,857 | B1* | 11/2002 | Chandler .......... G06F 17/30595 707/792 |
| 7,735,140 | B2* | 6/2010 | Datla .................. H04L 63/1433 726/22 |
| 7,801,128 | B2 | 9/2010 | Hoole et al. |
| 8,127,291 | B2 | 2/2012 | Pike et al. |
| 8,214,401 | B2* | 7/2012 | Rao .................... G06F 17/30734 707/794 |
| 8,352,941 | B1 | 1/2013 | Protopopov et al. |
| 8,365,294 | B2 | 1/2013 | Ross |
| 8,909,926 | B2* | 12/2014 | Brandt ................ H04L 63/1408 709/205 |
| 8,984,014 | B2* | 3/2015 | Obitko .................. G05B 21/02 707/602 |
| 2005/0050377 | A1 | 3/2005 | Chan et al. |
| 2005/0071840 | A1 | 3/2005 | Neiger et al. |
| 2007/0192862 | A1 | 8/2007 | Vermeulen et al. |
| 2007/0250929 | A1 | 10/2007 | Herington et al. |

(Continued)

FOREIGN PATENT DOCUMENTS

GB 2479619 10/2011

OTHER PUBLICATIONS

Garfinkel, Tal, et al., "A Virtual Machine Introspection Based Architecture for Intrusion Detection," In Proc. Network and Distributed Systems Security Symposium, Feb. 2003, 16 pages.

Primary Examiner — Thanhnga B Truong

(57) ABSTRACT

The disclosure herein describes a system for facilitating intelligent auditing of security log records. A set of security policies are converted into a set of web ontology language (OWL)-based rules. At the same time, log records are also converted into an OWL-based format. The system then applies the OWL-based rules, which can be in the form of a number of semantic web rule language (SWRL) statements, to the OWL-formatted log data. As a result, the system can identify potential security breaches which cannot be easily identified by conventional auditing methods.

18 Claims, 4 Drawing Sheets

(56) References Cited

U.S. PATENT DOCUMENTS

| | | |
|---|---|---|
| 2007/0266433 A1 | 11/2007 | Moore |
| 2008/0189769 A1 | 8/2008 | Casado et al. |
| 2008/0196100 A1 | 8/2008 | Madhavan et al. |
| 2008/0222717 A1 | 9/2008 | Rothstein et al. |
| 2008/0244569 A1 | 10/2008 | Challener et al. |
| 2008/0289028 A1 | 11/2008 | Jansen et al. |
| 2009/0006603 A1 | 1/2009 | Duponchel et al. |
| 2009/0113031 A1 | 4/2009 | Ruan et al. |
| 2009/0122710 A1 | 5/2009 | Bar-Tor et al. |
| 2009/0249473 A1 | 10/2009 | Cohn |
| 2009/0320093 A1* | 12/2009 | Glazier .................. G06F 8/10 726/1 |
| 2010/0138830 A1 | 6/2010 | Astete et al. |
| 2010/0235831 A1 | 9/2010 | Dittmer |
| 2011/0072486 A1 | 3/2011 | Hadar et al. |
| 2011/0078497 A1 | 3/2011 | Lyne et al. |
| 2011/0107331 A1 | 5/2011 | Evans et al. |
| 2011/0107406 A1 | 5/2011 | Frost et al. |
| 2011/0119748 A1 | 5/2011 | Edwards et al. |
| 2011/0219113 A1* | 9/2011 | Grewal .................. G06F 15/16 709/224 |
| 2011/0258701 A1 | 10/2011 | Cruz et al. |
| 2013/0074181 A1 | 3/2013 | Singh |
| 2013/0347131 A1 | 12/2013 | Mooring et al. |

\* cited by examiner

OWL-BASED INTELLIGENT SECURITY AUDIT

BACKGROUND

Enterprises often perform audits to check whether firewall rules adhere to security policies. This is a labor-intensive and time-consuming manual process that involves scanning logs to identify security breaches or mis-configured rules. Auditing typically occurs after an actual security breach and increases the remediation time. Security policy enforcement is a continuous process that requires refining rules to meet changing network configurations without violating existing policies.

Nowadays, enterprises use firewalls extensively to protect them from malicious attacks. Firewalls have become a ubiquitous device across different network segments to fend off both insider and outsider threats as well as to enforce secure network access policy. For example, in a typical enterprise environment, there can be multiple virtual local area networks (VLANs) providing network segregation with defined access levels within these segments as well as remote access over the public Internet for virtual private network (VPN) and mobile users. These requirements increase the number of policies implemented in the firewall. To satisfy a security policy requirement, security administrators often need to configure one or more firewall rules. As the number of policies increases, configuring the firewall rules can become a complex task. Market research has indicated that majority of firewall breaches result from firewall mis-configurations.

Firewall-rule management becomes even more critically important as more desktops and servers become virtualized. Auditing these rules at regular intervals adds another dimension of trust to network security. Audits are also performed to satisfy compliance to legal requirements such as Sarbanes-Oxley, Payment Card Industry Data Security Standard (PCI-DSS), and Health Insurance Portability and Accountability Act (HIPAA). Auditing typically involves manually analyzing all the firewall rules to check whether they satisfy the predefined security policy. To secure a network, a continuous auditing process might be necessary, because a rule may be sufficient to implement a policy today but newer threats or exploits in the future would require more rules to implement the same policy. In addition to the auditing process, administrators need to analyze frequently network access logs to identify anomalous behavior for breached access control policies and security threats. Access logs provide valuable information on a security compromise. Searching the log file for anomalies using tools or manually will be feasible only if the compromised security incident has left a sufficiently long trail. Nevertheless, this manual auditing process is not always reliable and remains prone to human errors.

SUMMARY

The disclosure herein describes a system for facilitating intelligent auditing of security log records. A set of security policies are converted into a set of web ontology language (OWL)-based rules. At the same time, log records are also converted into an OWL-based format. The system then applies the OWL-based rules, which can be in the form of a number of semantic web rule language (SWRL) statements, to the OWL-formatted log data. As a result, the system can identify potential security breaches which cannot be easily identified by conventional auditing methods.

BRIEF DESCRIPTION OF FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The present disclosure describes a system and a method that facilitates analysis of network access logs using web ontology-based concepts which can identify a security breach record from a large number of access log records. To achieve this level of analysis granularity, the security policies are represented in semantic web rule language (SWRL) statements, using web ontology (OWL) concepts. In addition, access-log database records are converted to semantic data information prior to being analyzed for breach of security policies.

Figure 1:
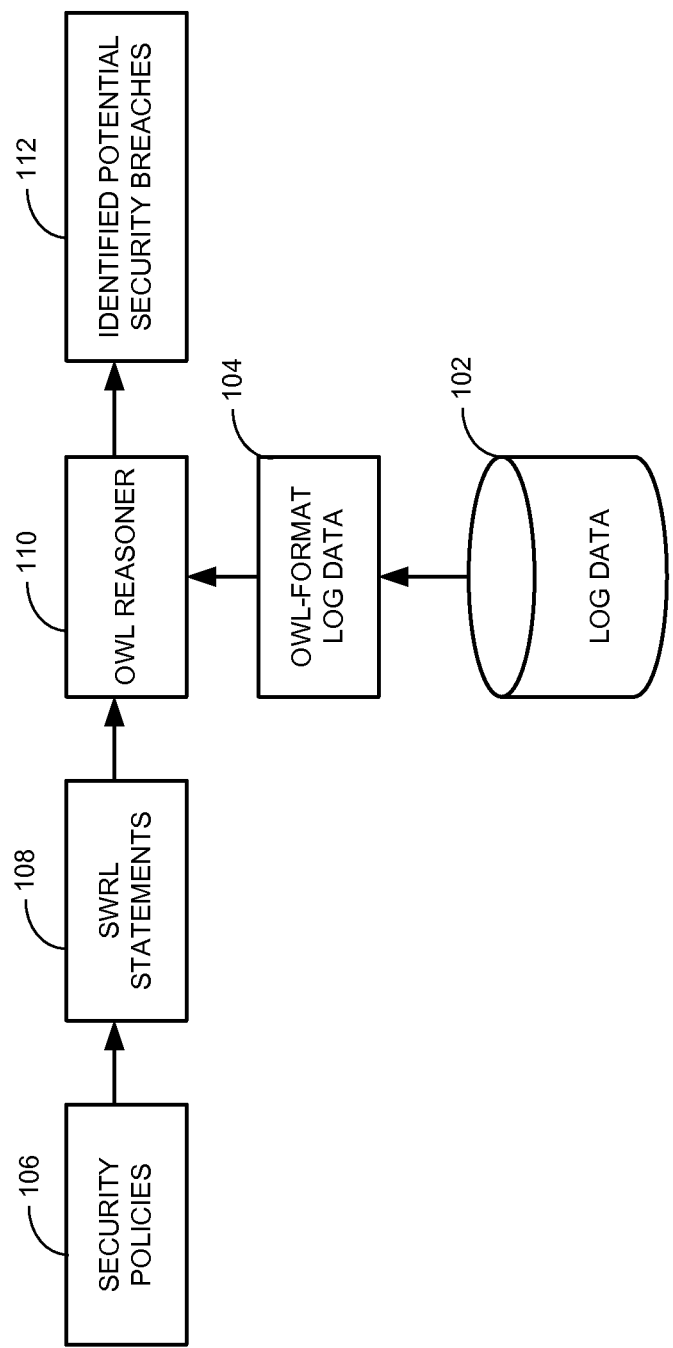
FIG. 1 presents a diagram illustrating an exemplary web ontology language (OWL)-based intelligent auditing system.

FIG. 1 presents a diagram illustrating an exemplary web ontology language (OWL)-based intelligent auditing system. During operation, the system may have access to a set of log data 102 which can be stored in a relational-database format. The system then converts the log data into a structured OWL-format 104 which can be processed by an OWL reasoner 110. Meanwhile, a system administrator or a user of the system converts a set of security policies 106 into one or more SWRL statements 108 which complies with the OWL standard. Subsequently, OWL reasoner 110 applies SWRL statements 108 to OWL-format log data 104 to identify potential security breaches 112. Details of various steps and operations in this process are described in more detail below. The following disclosure first explains how security log data are collected from VMs, and then explains how security policies and log data can be both converted into OWL-based format to facilitate the analysis.

Various mechanisms can be used to monitor events on a VM. Ideally, a VM's network traffic combined with user identity (such as user identity information based on Active Directory) and application information should be available to the monitoring process. One way to achieve such monitoring is to install an agent process on the VMs. This agent captures all network socket events inside the guest VM. The agent then sends information regarding these events along with the information regarding the process that is accessing the network, Active Directory user name (under which the process is launched), source IP, destination IP, source port, and destination port to an endpoint on the host where the guest VM resides.

Note that a guest VM can run both client and server processes. Client events are generated when an outgoing TCP/UDP connection is made or an existing connection is disconnected. Server events are generated when a process starts listening on a server socket bounded to particular IP and TCP/UDP port number. With these events, the event-monitoring system creates a database of records which can be queried to obtain information about the users accessing the network. This is helpful for the administrator to check whether an access policy is breached. One can filter all the records for the particular Active Directory user/group to check the policy with respect to a particular desktop or server. For example, if a VM is misconfigured and is placed in the wrong VLAN segment, a particular VM desktop user would be given incorrect access privileges. These kinds of access breaches can be identified by the event-monitoring system described herein. The event-monitoring system can also provide the log records by users, groups, computers, and application name, both for within VLAN groups and remote accesses.

Figure 2:
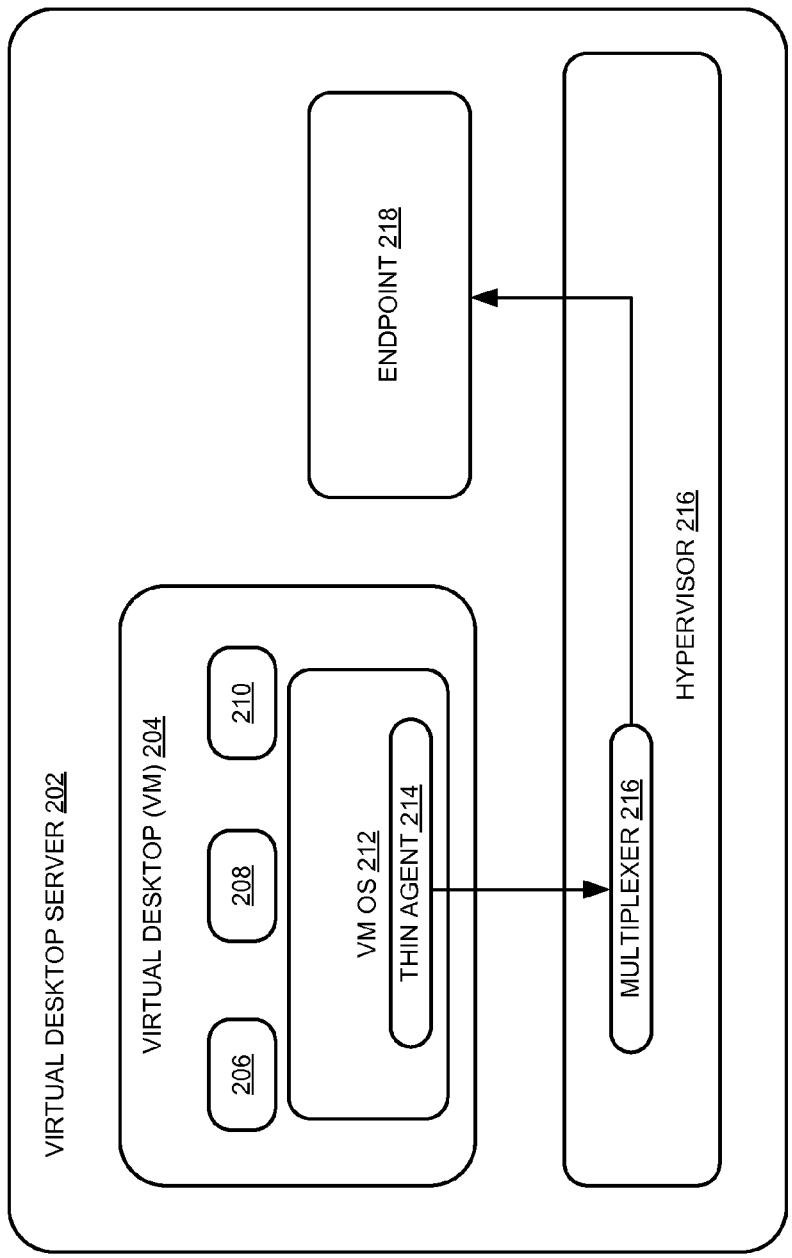
FIG. 2 illustrates an exemplary system for monitoring events in virtual machines.

FIG. 2 illustrates an exemplary system for monitoring events in virtual machines. In this example, a virtual desktop server 202 hosts, on top of a hypervisor 216, a number of virtual desktops (which are VMs), including virtual desktop 204, which runs a VM operating system (OS) 212. VM OS 212 runs a number of applications, such as a web browser 206, a word processor 208, and a spreadsheet application 210. Within VM OS 212 resides a thin agent 214 for monitoring virtual desktop 204's network related events. Thin agent 214 sends the collected event information to a multiplexer 216, which serves to aggregate all the event information collected from multiple VMs. Multiplexer 216 in turn sends the event information to endpoint 218, which stores the event information as log records in a database, which can be hosted locally within virtual desktop server 202 or remotely at a separate host.

In one embodiment of the system described herein, the security policy is modeled in a manner that is similar to the Unified Modeling Language (UML). An administrator can create groups that contain a set of VMs, Active Directory user groups or single users, or types of network accesses. The relationship between such a group and the security policy is represented by an arrow which indicated "allow" or "block" with respect to access of the corresponding network resource. Once a policy is modelled, an automatic firewall rule generation engine can be used to generate firewall rules. Further firewall rules can be edited manually if a particular policy cannot be modelled in the above manner.

As mentioned above, embodiments of the present system use Web Ontology Language (OWL) to formulate both the security policies and log records. Ontologies are derived from description knowledge which is used in artificial intelligence to facilitate reasoning. Ontology is a knowledge representation of a particular domain based on a set of individuals (also called entities or objects) and the relationships existing between these individuals. The logical statements indicate memberships of individuals in classes or relationships between individuals. In addition, such logical statements are used to specify knowledge about the classes and relationships. They specify constraints on the data set and form the knowledge base. This simply means that knowledge is about finding relationships between entities. For instance, if the logical statement "Firewall is a network device which secures network" needs to be represented in ontologies, first the entities need to be extracted from the statement. Here, "firewall" and "network" are two different entities related by security. In ontologies, "firewall" and "network" are represented as classes (entities), and the relationships between them are made available through the properties. So, the representation would be:

Class Network:

---
hasSecurityDevice value Firewall
SubClassof ( :Firewall :SecurityDevice)
--- which indicates that (1) Class "Network" has a property of "hasSecurityDevice" whose value is "Firewall," and (2) "Firewall" is a subclass of "SecurityDevice." This semantic is similar to that of an Object Oriented language.

Figure 3:
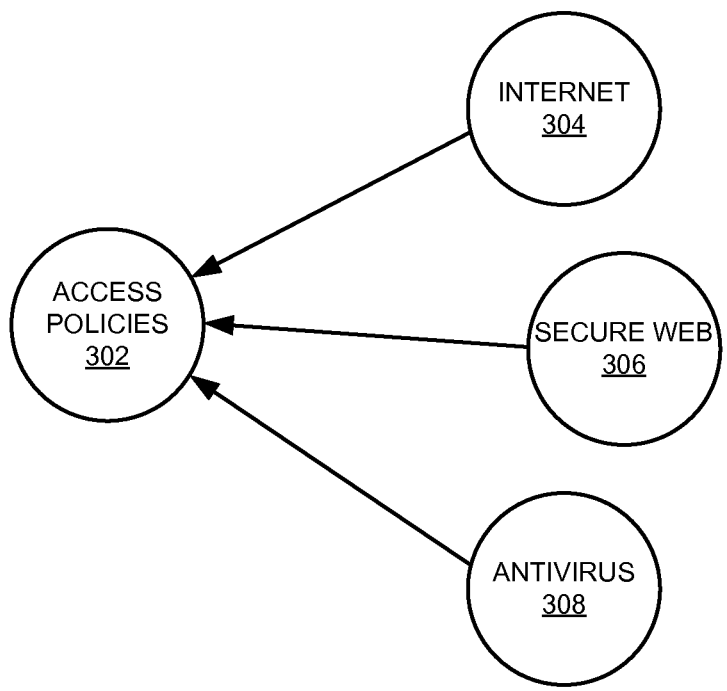
FIG. 3 illustrates exemplary sub-classes of a set of access policies.

Web Ontology Language (OWL) is a widely used language to represent ontologies. The present system uses OWL to represent the constructs which define the security policies. This way the system can represent a knowledge base of classes and their associated relationships for the security policies. Typically, a security expert defines the ontology statements, which involves laying down the classes, sub classes, and properties of a class which represent the relationships. For instance, FIG. 3 illustrates exemplary sub-classes of a set of access policies. In this example, the class of access policies 302 includes sub-classes of Internet 304, internal secure Web 306, and antivirus service 308.

Figure 4:
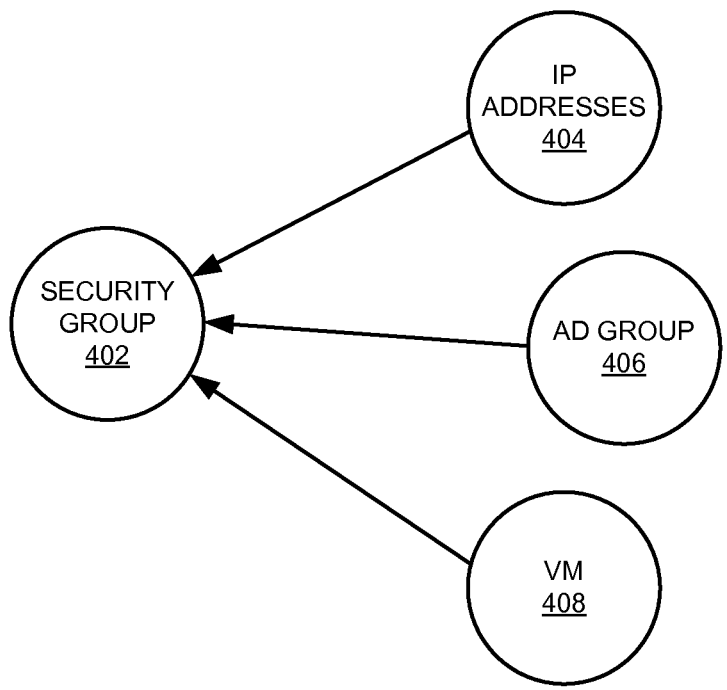
FIG. 4 illustrates exemplary relationship security policy groups.

In general, classification of security policies and their associated properties should be generic so that the policy processing can be performed in a vendor agnostic manner. The security policies can be enforced on security groups (also referred to as containers) which can be a collection of VMs, IP addresses, or AD user groups, as illustrated in FIG. 4. Here the class of security group 402 can include a set of IP address 404, one or more AD user groups 406, and one or more VMs 408.

Each "security group" class can have the properties hasInter-netAccess, hasSecureWeb or hasAntiVirus (see FIG. 3), depending on the way administrator defines the policy. Usually this configuration is represented by a security group's arrow pointing to the access policy which would allow or block rule. These kinds of relationships involving more than one individual property typically cannot be represented in standard OWL. A set of OWL extended axioms called Semantic Web Rule Lan-guage (SWRL) can be used to represent such relationships. SWRL provides horn-like rules using an antecedent (body) and consequent (head) on the class properties. SWRL facilitates composition of standard conditional statement (i.e., IF . . . THEN) based rules.

For example, in a hospital datacenter assume there is a policy to block public Internet access to the nurses. To validate this policy, all the access logs belonging to the "Nurse" AD group have to be checked for Internet access. The SWRL statement "SWRL (1)" below automates the process for finding the log record which has destination address as public IP. Assume that there is a pre-defined class "Access" with property hasDestinationAddress. This property is set to "PublicIP" if the destination address indicates a destination other than the nurses' network prefix.

SWRL(1):

---
Access(?x) ^ not contains(?DestinationAddress, "<nurse net-work prefix>") ->
hasDestinationAddres(?x, "PublicIP")
---

The access logs also provide the AD group name corresponding to the IP address accessed. The SWRL rule "SWRL (2)" below is used to check for the hasGroup and hasDestinationAddress properties for classes "Nurse" and "PublicIP," respectively. If SWRL (s) is true, the system moves the log record to the "BrokenPolicyLog" class. This list of Broken- PolicyLog contains the log records of all the nurse VMs that have attempted to access the Internet.

SWRL (2):

Access(?x) ^ hasGroup(?x, Nurse) ^ hasDestinationAd-dress(?x, PublicIP) -> BrokenPolicyLog(?x)

After the administrator models the policies, the modeled policies are translated to a set of SWRL rules (statements). The log data is typically stored in a Relational Database (RDB) which is also translated to OWL semantic data to correlate it with defined policies rules. A number of methods can be used to convert RDB-formatted data to OWL semantic data, including a W3C standard to convert RDB to Resource Description Framework (RDB2RDF). This standard can directly translate data from RDB format to RDF format which is similar to the OWL format. In general, the translation process involves converting each log record to OWL class individuals and setting the class properties based on the appropriate database fields. If, for example, there are millions of access records for 100 users, in OWL format these records are represented as a set of 100 individual classes with the appropriate properties set in them. This OWL formatted data is then loaded in an OWL reasoner. The reasoner validates all the SWRL rules by comparing the properties on the classes identifies the individuals which breach the policies.

An exemplary use case using the present OWL-based intelligent auditing system is described below. In this example, both doctors and nurses use a datacenter which represents a hospital. An example of the security policy specifies:

(1) Doctors are allowed to access the Internet.
(2) Nurses are precluded from accessing the Internet.
(3) Nurses are allowed to access a doctor's network and VM.

On the face of it, this use case looks fairly simple and a single rule can be added to the firewall to disallow access to the Internet from a nurse's VM. However, this rule can be easily circumvented if any VM in the doctor's network has a proxy server installed. A nurse can use the proxy server to access the Internet via the doctor's network. This type of security breach is difficult to identify manually by inspecting access logs that have a large number of records. Adding a static rule will not help prevent this type of breach. The following example illustrates a scenario where such a breach can occur:

(1) Gregory\Doctor starts server Squid.exe:8080.
(2) Jackie\Nurse accesses Squid.exe:8080.
(3) Gregory\Doctor Squid.exe accesses www.google.com.

The following table describes the OWL classes and their respective properties that can be used to facilitate OWL-based intelligent auditing for this use case:

| OWL class | Properties |
| --- | --- |
| InternetAccess | hasPublicdestinationaddress |
|  | hasProxyServerDestinationAddress |
| ProxyServer | hasServer |
| (is a subclass of Application) | hasInternetAccess |
| Doctor |  |
| (individuals belonging to "Doctor" AD group) |  |
| Nurse |  |
| (individuals belonging to "Nurse" AD group) |  |
| Application | hasApplicationName |

To identify a nurse accessing the Internet through proxy servers, the system uses two rules: one to identify the proxy server applications running in the network, and the other to identify any of the nurse machines accessing the proxy server. First, a proxy server is an application acting as a server (i.e., has the property "hasServer") to accept connection from a client and relays data to the requested Internet host (i.e., has the property "has InternetAccess"). The property "hasServer" is set on an application instance if the log record indicates a server event for that application. This is denoted in the SWRL statement "SWRL (3)" below where all the proxy applications running in the network are found from the log records.

SWRL (3):

Application(?x)^hasServer(?x true)^hasInternetAccess(?x, true)->ProxyServer(?x)

SWRL statement "SWRL (4)" checks for log records where a member of the AD Nurse group accesses a proxy server (which is indicated by the destination address of the request pointing to a proxy server).

SWRL (4):

Access(?a) ^ Group(?x) ^ hasName(?x, Nurse) ^ hasDestination(?x, Proxyserver) -> BrokenPolicyLog(?a)

With the above two SWRL statements, the OWL reasoner can identify failed nurse access control policy and point to the corresponding log record. Note that the auditing process is intelligent here because it does not require any rule to search for port 8080 (the typical proxy server port) or Squid.exe, the name of the proxy server process. This way of identifying breach is generic and can work even if the application or port number are changed.

Figure 5:
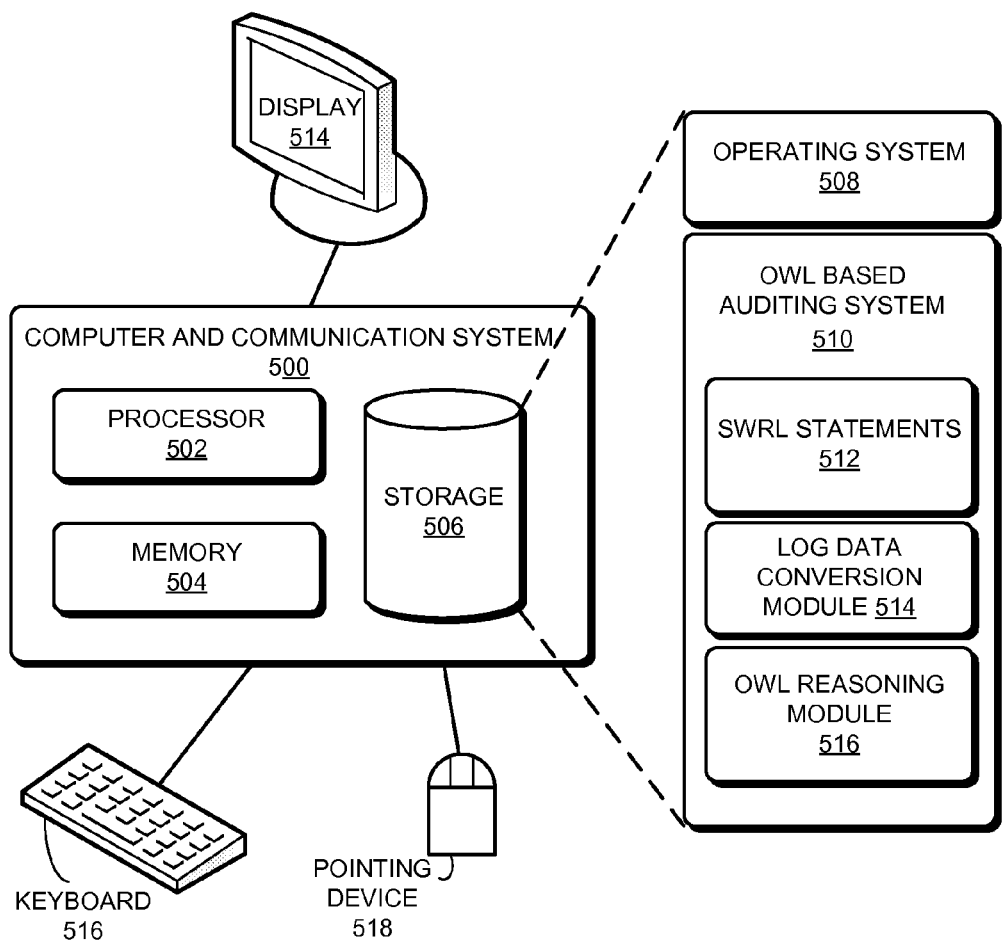
FIG. 5 illustrates an exemplary computer system for facilitating OWL-based intelligent security auditing.

FIG. 5 illustrates an exemplary computer system for facilitating OWL-based intelligent security auditing. In this example, a computer and communication system 500 includes a processor 502, a memory device 504, and a storage device 506. Computer and communication system 500 is also optionally coupled to a display device 514, a keyboard 516, and a pointing device 518.

During operation, instructions stored in storage 506 are loaded into memory 504 and executed by processor 502 to perform a number of operations. In one embodiment of the present system, the instructions stored in storage 506 can include an operating system 508 and an OWL based auditing system 510. OWL based auditing system 510 in turn includes a set of SWRL statements 512, a log data conversion module 514, and an OWL reasoning module 516. SWRL statements 512 are authored by an administrator to represent security policies. Log data conversion module 514 converts the RDB formatted log records into OWL format. OWL reasoning module 516 then applies SWRL statements 512 to converted log data.

In summary, the present inventive system uses ontology based methods to facilitate intelligent auditing of security log data, without requiring any training data. Knowledge base can be updated frequently to include new OWL classes and SWRL rules to process log data for new threats.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating intelligent auditing of security log data and validation of firewall configuration, the method comprising:
    receiving a set of rules translated from a security policy, wherein a respective rule from the set of rules is translated to be represented as a Semantic Web Rule Language (SWRL) statement;
    correlating log data with the translated set of rules, the correlating comprising:
        converting the log data into Web Ontology Language (OWL)-based format by converting original relational database(RDB)-formatted log data into a Resource Description Framework (RDF) format; and
        applying the translated set of rules to the OWL-format log data; and
    identifying, by a processor, one or more records of the log data which indicate potential violation of the security policy based on results of applying the translated set of rules.

2. The method of claim 1, wherein a respective record in the log data identifies a process, a user name under which the process is started, a source IP address, a source port, a destination IP address, and a destination port.

3. The method of claim 1, wherein original log data is stored in a RDB format.

4. The method of claim 1, wherein a respective record in the log data indicates a client event or a server event.

5. The method of claim 4, wherein a server event corresponds to a server process being started to listen on a server socket.

6. The method of claim 4, wherein a client event corresponds to a client process being started to initiate an outgoing Transmission Control Protocol (TCP) connection or to terminate an existing TCP connection.

7. A storage device storing instructions which when executed by a computer cause the computer to perform operations comprising:
    receiving a set of rules translated from security policies, wherein a respective rule from the set of rules is translated to be represented as a structured Semantic Web Rule Language (SWRL) statement;
    correlating log data with the translated set of rules, the correlating comprising:
        converting the log data into Web Ontology Language (OWL)-based format by converting original relational database(RDB)-formatted log data into a Resource Description Framework (RDF) format; and
        applying the translated set of rules to the OWL-format log data; and
    identifying one or more records of the log data which indicate potential violation of at least one security policy based on results of applying the translated set of rules.

8. The storage device of claim 7, wherein a respective record in the log data identifies a process, a user name under which the process is started, a source IP address, a source port, a destination IP address, and a destination port.

9. The storage device of claim 7, wherein original log data is stored in a RDB format.

10. The storage device of claim 7, wherein a respective record in the log data indicates a client event or a server event.

11. The storage device of claim 10, wherein a server event corresponds to a server process being started to listen on a server socket.

12. The storage device of claim 10, wherein a client event corresponds to a client process being started to initiate an outgoing Transmission Control Protocol (TCP) connection or to terminate an existing TCP connection.

13. A computer system, comprising:
    a processor; and
    a storage device storing instructions which when executed by the processor cause the processor to perform operations comprising:
        receiving a set of rules translated from a security policy, wherein a respective rule from the set of rules is translated to be represented as a Semantic Web Rule Language (SWRL) statement;
        converting the security log data into Web Ontology Language (OWL)-based format by converting original relational database(RDB)-formatted log data into a Resource Description Framework (RDF) format; and
        applying the translated set of rules to the OWL-format log data; and
        identifying one or more records of the log data which indicate potential violation of the security policy based on results of applying the translated set of rules.

14. The computer system of claim 13, wherein a respective record in the log data identifies a process, a user name under which the process is started, a source IP address, a source port, a destination IP address, and a destination port.

15. The computer system of claim 13, wherein original log data is stored in a RDB format.

16. The computer system of claim 13, wherein a respective record in the log data indicates a client event or a server event.

17. The computer system of claim 16, wherein a server event corresponds to a server process being started to listen on a server socket.

18. The computer system of claim 16, wherein a client event corresponds to a client process being started to initiate an outgoing Transmission Control Protocol (TCP) connection or to terminate an existing TCP connection.

* * * * *